May 20, 1969

KARL-HEINZ HONSEL 3,444,791

METHOD FOR MAKING FILTER CONES

Filed Aug. 10, 1966

Inventor:
KARL-HEINZ HONSEL
BY Robert H. Jacob
AGT.

3,444,791
METHOD FOR MAKING FILTER CONES
Karl-Heinz Honsel, Am Waldwinkel 16,
48 Bielefeld, Germany
Filed Aug. 10, 1966, Ser. No. 571,524
Claims priority, application Germany, Aug. 10, 1965,
H 56,810
Int. Cl. B31d *5/00;* B31b *1/60;* B01d *35/00*
U.S. Cl. 93—1                                          1 Claim

ABSTRACT OF THE DISCLOSURE

Method for producing trapezoidal filter cones from a web of filter paper having a plurality of offset rows of blanks. The cones are cut from the web by zig-zag cuts to avoid waste.

---

Figure 1:
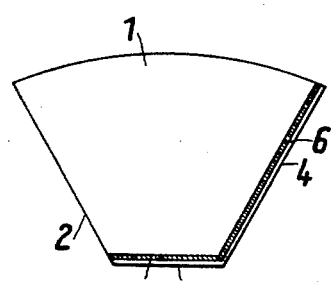

The present invention relates to filter cones of the type used in making beverages such as coffee or tea. More in particular the invention relates to a new method for making a filtering bag of the type generally referred to as a filter cone.

For the production of hot brewed beverages such as coffee, tea or the like, filter devices are extensively used which are fitted to a filter cone which is of trapezoidal shape. Such filter cones consisting of filter paper serve only once to fulfill their intended purpose, and particularly for that reason such filter cones are decidedly mass-production articles. Especially in view of the one time use of this filter cone, it is desirable that the cost of producing such a filter cone is reduced to the greatest possible extent.

It is an object of this invention to enable the production of such filter cones of trapezoidal shape at particularly low cost. In the production of such filter cones great efficiency of the machines is to be obtained by means of a suitable arrangement whereby in the production of the filter cone the waste of filter paper is small, and in addition the usefulness of the filter cone in accordance with the invention is to be increased, as compared to known filter cones.

Filter cones in trapezoidal shape are already known which are produced from a cut blank. Two equal congruent surface parts are folded onto one another about one lateral edge of the trapezoidal surface. These two surface parts have to be connected with one another at the bottom seam and along one of the lateral seams. This connection is obtained by an edging, such as a knurled edging, which can of course be replaced by a gluing operation or by a seam.

The production of these known filter cones from a single blank with two trapezoidal sheets which are folded onto one another results in the accumulation of a relatively large amount of waste filter paper. Beyond that, during the filtering the bottom edge of the filter cone seated in the filtering device is particularly subjected to wear.

In accordance with the invention the cutting of the filter cone from a double trapezoid, the halves of which are oriented in opposite directions, is effected so that two equal congruent cuts are formed which are folded onto one another about their common base line. In this manner it is accomplished that the bottom edge of the filter cone does not have a seam. The bottom edge of the filter cone is formed solely by the folding edge of the unitary blank of filter paper.

This means not only that particularly this bottom edge of the filter cone in accordance with the invention can be subjected to greater wear than in known filter cones, but the filter cone in accordance with the invention affords a further advantage in that at the bottom edge filter paper may be saved. This eliminates the edge section which heretofore was necessary and provided with edging.

In the known filter cones when they were inserted in the filter device, the border section provided with the border edging was folded manually over by an angle of 180°. From this it results that particularly at the bottom portion of the filter cone a thickening inevitably results on one side which consists of three layers of paper, while the opposite plane of the filter cone consists only of a single layer. From this it results that the water penetration at this bottom portion of a filter is entirely different at the two filter walls, and particularly the filter wall which consists of only a single layer of paper is necessarily subjected to the greatest stress.

These shortcomings are avoided in the filter cone in accordance with the invention. At the bottom edge of the filter cone no additional closure is needed at all, and both filter walls at the bottom portion are subjected evenly to stress during filtering.

It is furthermore an object of the invention to produce the filter cone discussed above in such a manner that great efficiency can be attained with a minimum amount of waste. Accordingly, the method in accordance with the invention for producing the filter cone resides, first of all, in that angular lateral cutouts are undertaken in a running paper web. Thus there are developed a multitude of connected cone blanks which are arranged in rows and which are then separated to constitute single blanks. Then the two trapezoidal portions of the blank that belong to one another are folded over in order to form a single filter cone.

One may proceed with this method in such a manner that a paper web is utilized of such width that several cone blank strips are formed which are disposed alongside one another and displaced by one-half of the blank size. Particularly with such a method the resulting waste is decreased to a minimum. In this manner there results no waste at all between two adjacent cone blank strips.

Merely at the two outer edges of the paper web which is utilized a small amount of inevitable waste results, because here an angular cutout must be severed to constitute one cutting line of the paper cone.

By means of paper working machines known per se which produce cones from the web it is possible to produce in a plurality of strips a number of filter cones simultaneously in one and the same machine.

Figure 3:
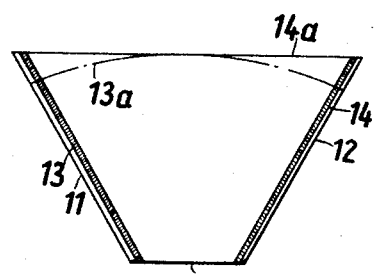
Figure 2:
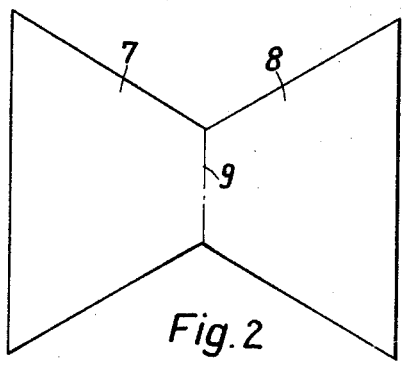
Figure 4:
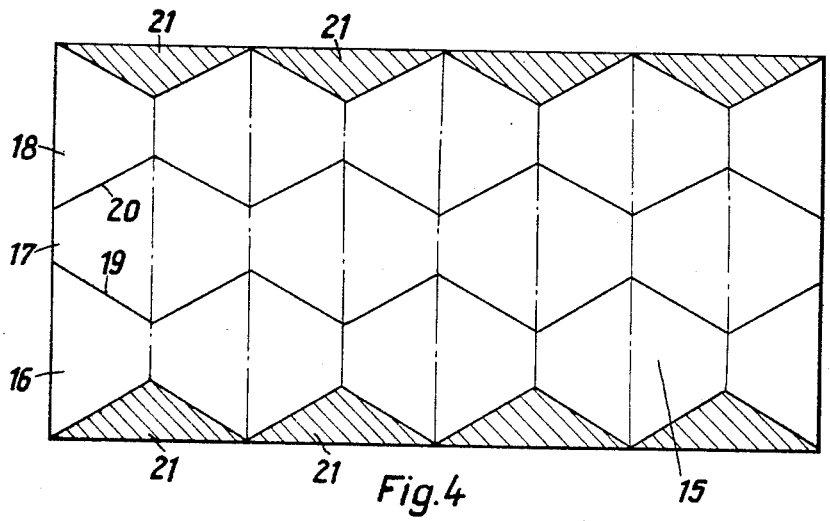
Figure 5:
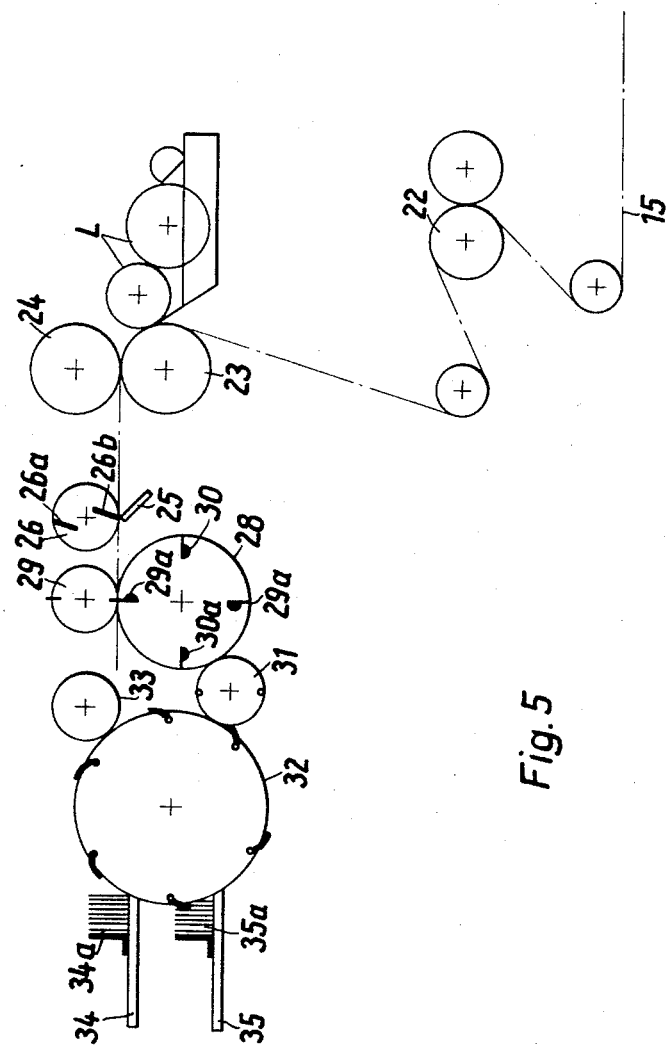

Further advantages and details of the invention will become apparent from the following description with reference to the accompanying drawings which illustrate the subject of the invention in connection with an embodiment, and in which FIG. 1 illustrates, for better understanding of the invention, a filter cone in accordance with the known state of the art, FIG. 2 shows the blank of a filter cone in accordance with the invention, FIG. 3 illustrates the finished filter cone in accordance with the invention where as a modified embodiment the upper arcuate edge is drawn in a dash and dot line, FIG. 4 shows a paper web with three adjacent cone blank strips, and FIG. 5 is a side view of a schematic illustration of an arrangement for producing the filter cone in accordance with FIG. 3.

The known filter cone 1 in accordance with FIG. 1 consists of two congruent blank cuts of trapezoidal shape placed on top of one another. These two cut blanks are brought together by turning them about the lateral edge 2 through an angle of 180°. The bottom edge 3 and the lateral edges 4 must be connected with one another. This is effected normally by means of an edging 5 or 6.

In accordance with the invention the blank for a filter cone consists of two trapezoidal cuts 7 and 8 directed opposite to one another and which have a common base line 9. These trapezoidal cuts 7 and 8 are folded about the common base line 9 so that a bottom edge 10 is formed, for which a special closure is unnecessary, but in this case, rather the lateral edges 11 and 12 are provided with edging 13, 14. FIG. 3 reflects in dash and dot lines that the upper edge 13a may also be cut arcuately as is known from prior art filter cones. But also the upper edge 14a which extends along a straight line in accordance with FIG. 3 has the additional advantage over the arcuately formed upper edge that the triangular filter cone tips that project from the filtering vessel or device when the filter cone is inserted can be conveniently manipulated in order to remove the filter cone with ground coffee, tea or the like, which has become wet after the filtering operation. Thus it is not necessary to pull on the wet filter paper that has been weakened when it is removed from the filtering device.

As indicated in FIG. 4, it is possible in an unusually economical manner to make the filter cone of FIG. 3 in accordance with the invention by utilizing a blank in accordance with FIG. 2. The paper web indicated at 15 has three adjacently disposed blank strips 16, 17 and 18. Each one of these paper blank strips consists of aligned blanks, as illustrated in FIG. 2. The angular separating lines 19, 20 between the cone blank strips 17 on the one hand and the adjacent cone blank strips 16 and 18 on the other hand are disposed in the paper web in such a manner that at these locations no waste of filter paper results at all. In the simultaneous production of filter cones on three adjacent core blank strips, there results a waste of filter paper only at the outer edges of the paper web 15, and these are the triangular pieces of waste 21.

FIG. 5 illustrates schematically an apparatus by means of which filter cones can be produced by utilizing a paper web 15 in accordance with FIG. 3. The paper web 15 is first fed to the cutting device 22 where the angular cuts 19, 20 are applied to the web. The running cone blank strips 16, 17, 18, which have thus been formed, are pulled up through the pulling cylinders 23 and pulling devices 24 and fed to the cutting device, which consists of a stationary cutter 25 with a rotating cutter arrangement 26. This cutting cylinder carries two upper cutters 26b that are displaced by 180°. With the aid of this cutting device the three cone blank strips are separated in individual work blank strips, each of which corresponds to the blank in accordance with FIG. 2. These cone blanks are now introduced in the folding tool cylinder 28 which cooperates with the folding cutter cylinder 29. The cone blanks, such as those of the cone blank strips 16 and 18 which are fed at the same speed of operation, are seized by the folding tools 29a, while the cone blanks of the cone blank strip 17 are seized by the folding tools 30 and 30a.

The blanks thus folded, which now have already been formed in accordance with FIG. 3 of the drawings, are fed by way of the transfer cylinder 31 to the depositing cylinder 32 and the edging device 33. The completed filter cones of the filter cones strips 16 and 18 may now be stacked onto the upper depositing table 34, and the completed filter cones from the filter cone strip 17 may be stacked on the lower depositing table 35. The stacked filter cones on the table 34 are identified at 34a, and those on the table 35 at 35a.

It can be readily conceived that such a machine can also operate with a paper web which has six or even more filter cone strips disposed alongside one another. The greater the output of the machine, the smaller will be the percentage of waste of filter paper which falls off the outer edges.

The term "filter cone" as used in this specification is used in a broad sense to describe a bag which, when expanded and placed in a receptacle, has the approximate appearance of a frusto-conical body, and it is not intended to limit the disclosure to the geometrical definition of a cone.

If the side edge closure of the filter cone is not to be produced by edging but by gluing, then the apparatus in accordance with FIG. 5 can be provided with a gluing device known per se, such as indicated at L in FIG. 5.

Having now described my invention with reference to the embodiment illustrated in the drawings, I do not wish to be limited thereto, but what I desire to protect by Letters Patent of the United States is set forth in the appended claim.

I claim:

1. Method for producing filter cones of trapezoidal outline having congrent trapezoidal halves and a closed bottom at the common short side of the halves, comprising the steps of providing a web of filter paper with a plurality of rows of straight line zig-zag cuts interconnected longitudinally of the web to form a plurality of strips defining blanks, where blanks in adjacent strips are offset relative to one another by one-half the length of a blank, said strips engaging each other laterally without waste therebetween, separating each strip by straight transverse cuts to form blanks each in the form of a double trapezoid having a common short side and straight diverging linear sides, folding each strip along the short side of said double trapezoid, and connecting the adjacent straight linear sides diverging from said short side by edging to form the filter cone.

References Cited

UNITED STATES PATENTS

| | | |
|---|---|---|
| 963,894 | 7/1910 | Hoar. |
| 1,107,347 | 8/1914 | Powers. |
| 1,341,835 | 6/1920 | Avery et al. |
| 1,972,006 | 8/1934 | Carew. |
| 2,165,277 | 7/1939 | Koch et al. |
| 2,171,484 | 8/1939 | Squire _____ 210—497 |
| 2,237,346 | 4/1941 | Gilfillan _____ 156—250 X |
| 2,349,115 | 5/1944 | Sanford _____ 210—497 |
| 2,353,183 | 7/1944 | Niederauer. |
| 3,199,275 | 8/1965 | Fesco _____ 210—497 X |

FOREIGN PATENTS

| | | |
|---|---|---|
| 1,105,494 | 12/1955 | France. |
| 88,253 | 8/1896 | Germany. |
| 640,946 | 1/1937 | Germany. |

REUBEN FRIEDMAN, *Primary Examiner.*

C. M. DITLOW, *Assistant Examiner.*

U.S. Cl. X.R.

93—36.05; 156—250; 210—477, 497; 229—1.5